US006173476B1

(12) United States Patent
Daoud

(10) Patent No.: US 6,173,476 B1
(45) Date of Patent: Jan. 16, 2001

(54) HINGE ASSEMBLY PARTICULARLY SUITED FOR GROUNDING

(75) Inventor: Bassel Hage Daoud, Parsippany, NJ (US)

(73) Assignee: Avaya Technology Corp., Miami Lakes, FL (US)

( * ) Notice: Under 35 U.S.C. 154(b), the term of this patent shall be extended for 0 days.

(21) Appl. No.: 09/143,201

(22) Filed: Aug. 28, 1998

(51) Int. Cl.[7] .................................................... G05D 11/10

(52) U.S. Cl. ................................ 16/323; 16/286; 16/291; 16/387

(58) Field of Search ............................. 16/323, 322, 366, 16/368, 280–282, 286, 287, 291, 387; 220/810, 829–827, 831–834

(56) References Cited

U.S. PATENT DOCUMENTS

| | | | | |
|---|---|---|---|---|
| 431,349 | * | 7/1890 | Hart | 16/280 |
| 783,410 | * | 2/1905 | Bergoff | 16/293 |
| 1,319,554 | * | 10/1919 | Anderson | 16/73 |
| 2,290,219 | * | 7/1942 | Ulfving | 16/291 |
| 2,433,483 | * | 12/1947 | Root, Jr. | 220/829 |
| 3,121,909 | * | 2/1964 | Young | 220/829 |
| 3,233,820 | * | 2/1966 | Williams | 220/829 |
| 3,385,344 | * | 5/1968 | Andrews | 16/73 |
| 4,452,373 | * | 6/1984 | Pearce | 16/291 |
| 4,765,027 | * | 8/1988 | Andric | 16/354 |

FOREIGN PATENT DOCUMENTS

| | | | | |
|---|---|---|---|---|
| 931710 | * | 8/1955 | (DE) | 16/291 |
| 521557 | * | 5/1940 | (GB) | 16/293 |

* cited by examiner

*Primary Examiner*—Chuck Y. Mah
(74) *Attorney, Agent, or Firm*—Howard C. Miskin; Gloria Tsui-Yip

(57) ABSTRACT

A hinge assembly for a box having a base and a cover and comprising a hinge section and a spring section. The hinge section has a pair of segments pivotally mounted to each other. Each segment has outer channel-forming knuckles extending from its outer side edge. The spring section has channel-forming knuckles which extend from each side edge which are pivotally mounted to the outer knuckles of the hinge section. The spring section applies pressure to the two segments of the hinge section in order to maintain the segments of the hinge section into conductive contact with each other and prevent inadvertent folding or unfolding of the segments of the hinge section, thereby preventing inadvertent opening or closing of the box. The outer knuckles of the hinge section and the knuckles of the spring section are pivotally connected together. The spring section is an arcuate U-shaped spring in the form of a loop having spaced legs and knuckles extending from its side edges which are spaced apart at a distance less than the diametrical distance between said legs.

14 Claims, 6 Drawing Sheets

HINGE ASSEMBLY PARTICULARLY SUITED FOR GROUNDING

FIELD OF THE INVENTION

The present invention relates to a hinge assembly and more particularly to a grounding hinge assembly for use with a junction box for electrical components or the like.

BACKGROUND OF THE INVENTION

Junction boxes for electrical components, such as transformers, are usually made of metal and comprise a base and a cover which are hinged together with a metal hinge. The box is mounted on a metal support which acts as a ground. A separate grounding cable is ordinarily provided to electrically connect the cover to the base so that any electrical impulse will be grounded to protect the workers as well as to protect the box and the instruments therein. However, sometimes, inadvertently, it is possible to forget either adding the grounding cable between the cover and the base or to re-connect a grounding cable that has been disconnected while servicing other components in the box. This can produce a dangerous situation.

In addition, it has been found that when the box is closed, separate mechanisms, such as latches, are used to keep the box closed and prevent it from opening inadvertently. It has also been found that when the box is open, other mechanisms are used to keep the box open and to prevent the box from closing inadvertently.

Therefore, there is a need for a hinge assembly which keeps the box in its open or closed position and prevents it from opening or closing inadvertently and which acts as a ground between the base and the cover of a box.

SUMMARY OF THE INVENTION

The invention provides a hinge assembly that keeps a junction box closed or open and which acts as a ground between the base and the cover of the junction box.

The hinge assembly of the present invention has two sections. One of the sections is a spring section and the other section is a hinge section having two pivoted segments. The force that is exerted on the hinge section by the spring section not only produces an excellent electrical connection between the two segments of the hinge section to therefore provide a grounding between the cover and the base of the box but also will keep the box in either the open or closed position.

BRIEF DESCRIPTION OF THE DRAWINGS

A preferred embodiment of the invention has been chosen for purposes of illustration and description and is shown in the accompanying drawings forming a part of the specification wherein.

DETAILED DESCRIPTION OF THE PREFERRED EMBODIMENTS

Figure 7:
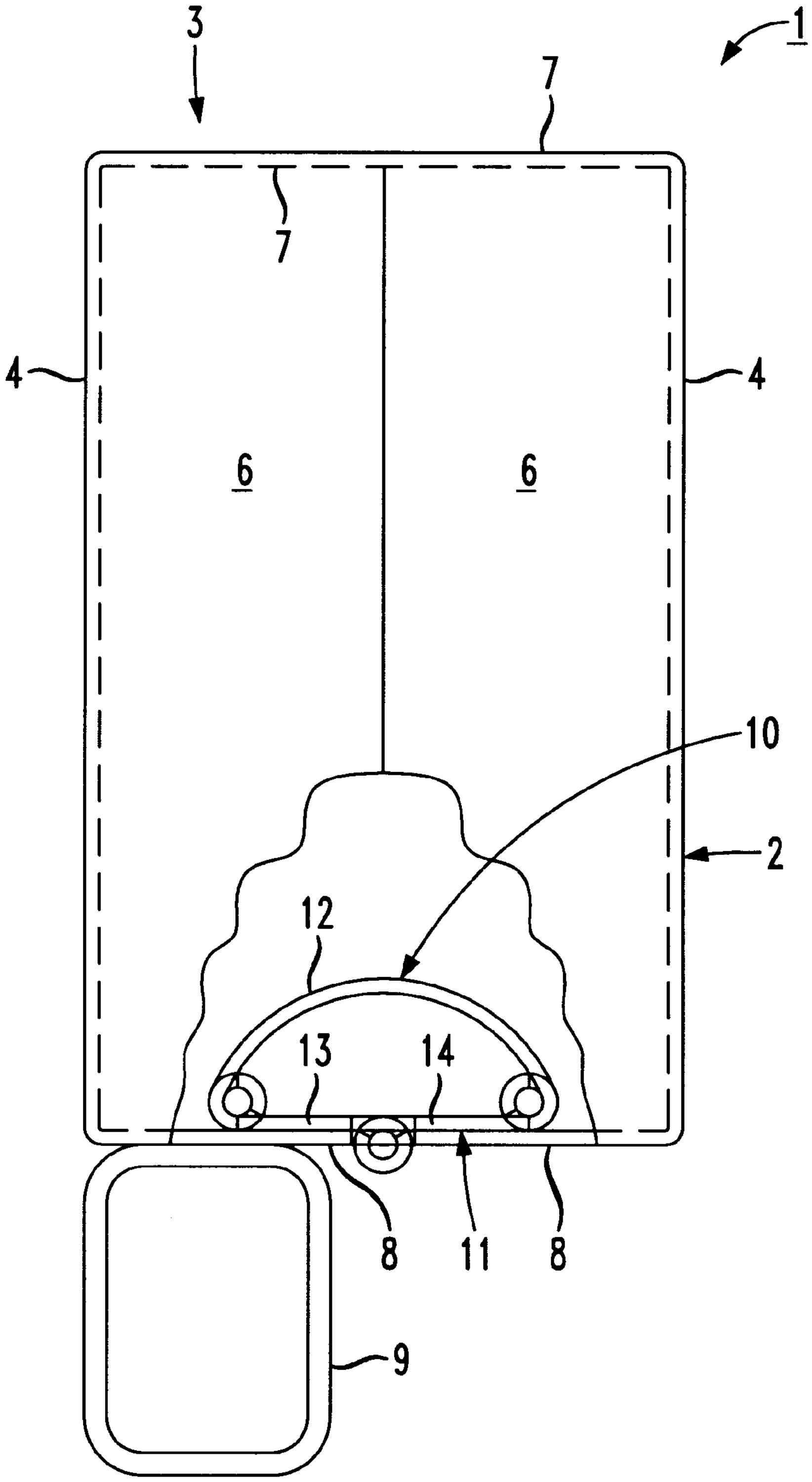
FIG. 7 is a simplified view of a box with which the present invention is used showing the position of the parts when the cover is closed.
Figure 8:
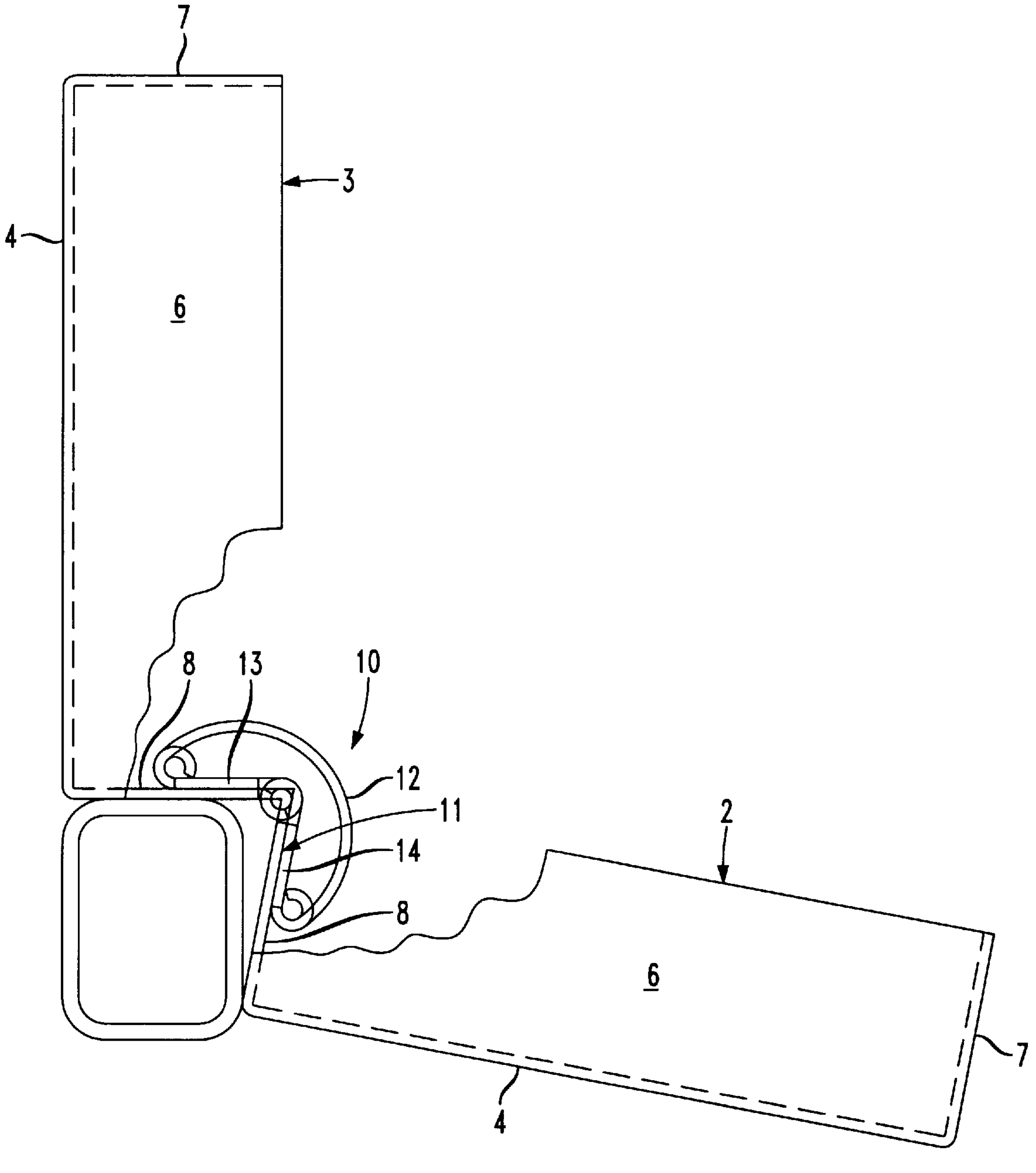
FIG. 8 is a view similar to FIG. 7 showing the position of the parts when the cover is open.

Referring to the drawings and more particularly to FIGS. 7 and 8, the present invention is adapted for use in connection with a junction box or container 1 for electrical components. The box has a cover 2 and a base 3 made out of metal and hinged to each other by a hinge assembly 10 so that the cover 3 may move relative to the base 2 from a closed position (FIG. 7) to an open position (FIG. 8). The cover 2 and base 3 may each comprise upstanding end walls 7 and 8 and side walls 6 connected together by wall panel 4. A trough 9 is provided for dressing cables entering and exiting the box 1 and is attached to the end wall 8 of base 3 in any well-known manner. The trough 9 is preferably made of metal to act as a ground for the box 1. As shown in the drawings, the trough 9 also limits the movement of the cover 2 when the box 1 is open.

Figure 1:
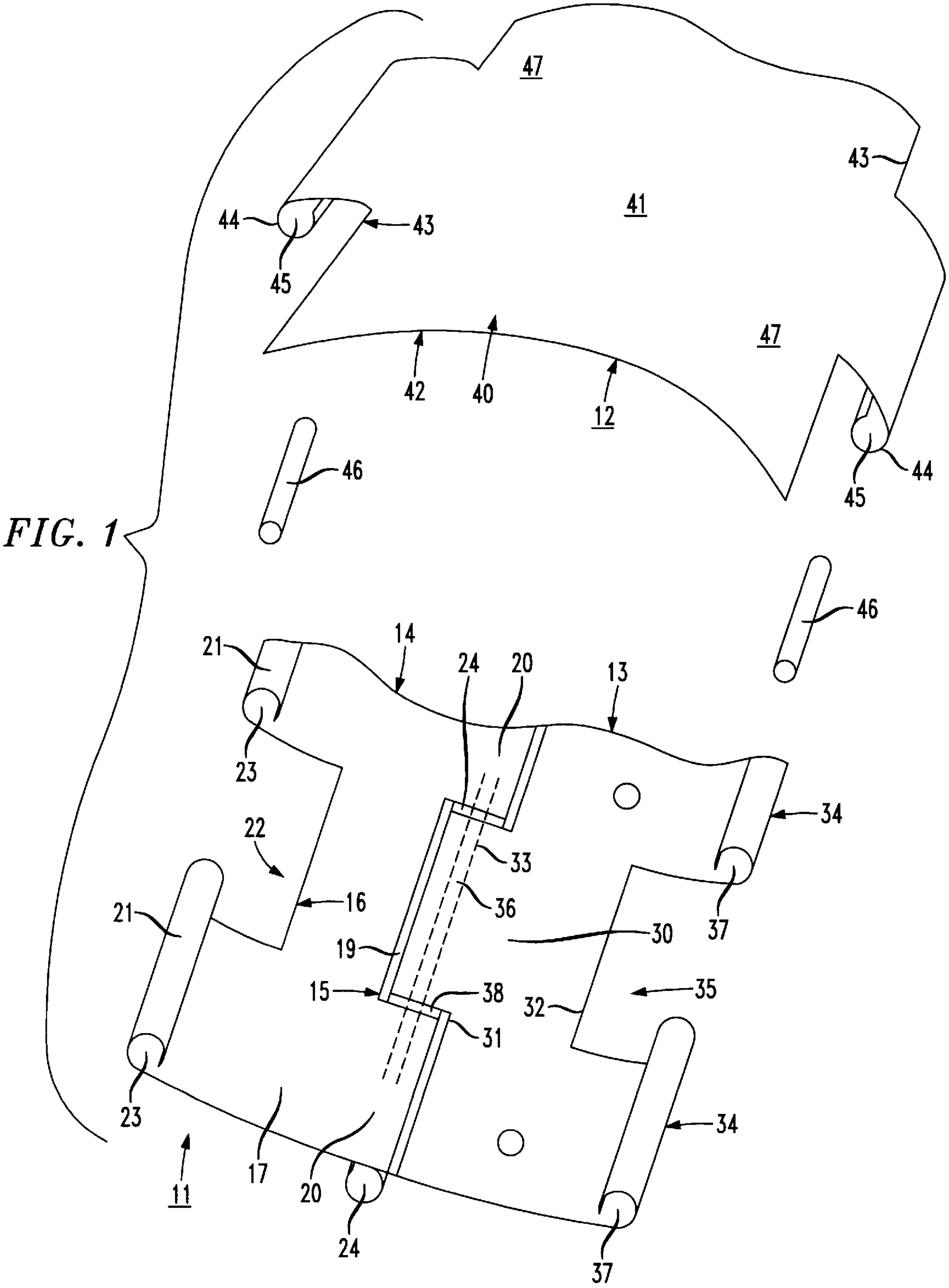
FIG. 1 is a simplified diagrammatic perspective view of a hinge assembly made in accordance with the present invention.
Figure 3:
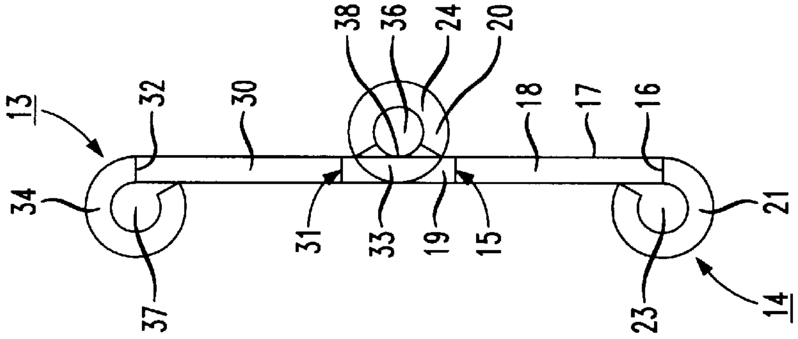
FIG. 3 is an end view thereof.
Figure 2:
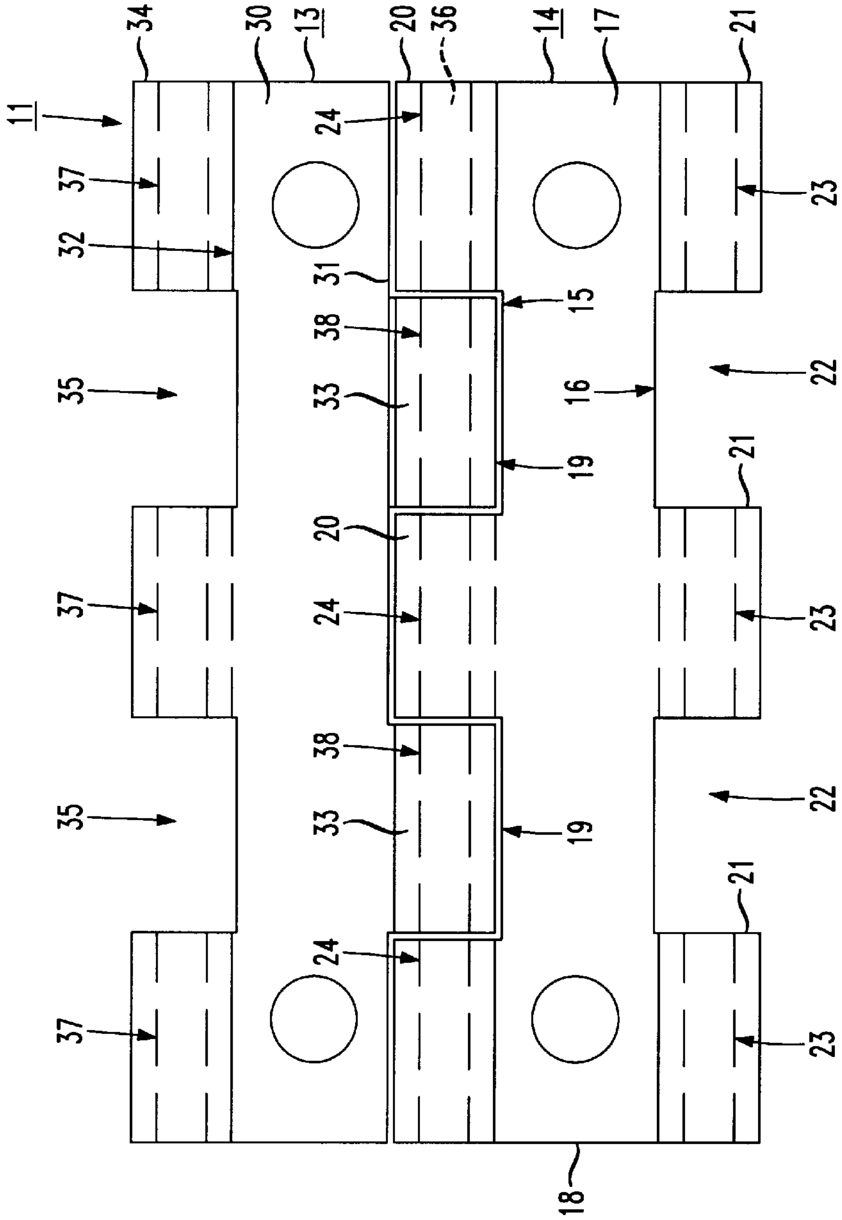
FIG. 2 is a top plan view of the hinge section of the hinge assembly.

The hinge assembly 10 for holding the base 3 and the cover 2 together in pivotal relationship to each other comprises a pair of sections 11 and 12 which are adapted to be fitted together to form the hinge assembly 10. The first section 11 (FIGS. 2–3) is a hinge section which comprises male and female hinge segments 13 and 14, respectively, pivotally mounted together. The female hinge segment 14 has a body portion 17 having end edges 18 and inner and outer side edges 15 and 16, respectively. Extending from the inner side edge 15 are a plurality of inner knuckles 20 which are spaced from each other to form inner female space 19. Extending from the outer side edge 16 are a plurality of outer knuckles 21 which are spaced from each other to form outer female space 22. As seen from FIGS. 7 and 8, the outer knuckles 21 are coiled upwardly toward the inner edge 15 of body portion 17 to form channels 23 and the inner knuckles 20 are coiled downwardly toward the outer edge 16 of the body portion 17 to form channels 24.

The male segment 13 has a body portion 30 having an inner edge 31 and an outer edge 32. The inner edge 31 has a plurality of male inner knuckles 33 extending therefrom and adapted to fit in the female space 19 of female segment 14 between knuckles 20. A plurality of spaced outer knuckles 34 extend from the outer edge 32 to form outer female space 35. The outer knuckles 34 of the male segment 13 are tightly coiled upwardly (FIGS. 7 and 8) toward the inner edge 31 of the body portion 30 to form channels 37 and the inner knuckles 33 are tightly coiled in a downward direction toward the outer edge 32 of the body portion 30 to form channels 38. Pins 36 are adapted to be inserted into the channels 24 and 38 of the segments 14 and 13, respectively, in order to hold the two segments 13 and 14 together in pivotal relationship to each other.

Figure 5:
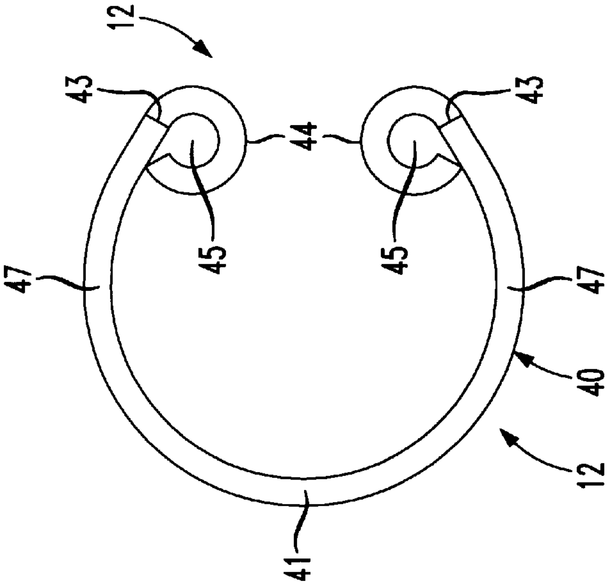
FIG. 5 is an end view thereof.
Figure 4:
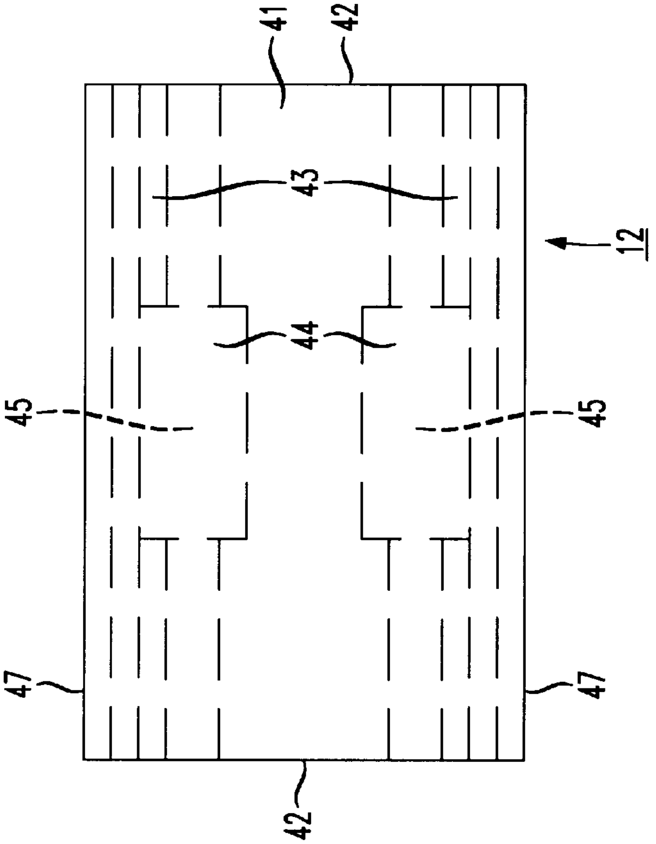
FIG. 4 is a top plan view of the spring section of the hinge assembly.

The second section 12 of the hinge assembly 10 is a spring section (FIGS. 4–5) comprising a curved resilient spring member 40 having a central elongated body portion 41, comprised of legs 47, end edges 42, side edges 43, and a male knuckle 44 spaced inwardly from the end edges 42 and extending from each side edge 43. The body portion 41 is curved inwardly in a downward direction so that the side edges 43 and the knuckles 44 face each other. The knuckles 44 are tightly coiled downwardly and inwardly toward each other to form channels 45. The spring section 12 normally assumes the practically closed U-shaped configuration shown in FIG. 5 with the knuckles 44 facing each other. It will be noted that the knuckles 44 are closer together than the diametrical distance between the legs 47 of the spring member 40 and that the spring member 40 is a closed loop for more than 180 degrees and for approximately 270 degrees. The spring section 13 is resilient so that if squeezed and released the spring 13 will resume it original shape shown in FIG. 5, and if spread and released it will again resume its original shape as shown in FIG. 5.

In order to assemble the two sections 11 and 12 together to form the hinge assembly 10, the male knuckles 44 of the spring section 12 are inserted into the outer female spaces 22 and 35 in the hinge section 13 so that channels 45 are in alignment with both channels 23 and 37. Pins 46 are inserted into the channels 45 and 23 and channels 45 and 37 to hold the two sections 11 and 12 together and to complete the hinge assembly 10.

When the hinge assembly 10 is to be mounted on the box 1, the body portions 17 and 30 of the hinge segment 13 are mounted on and attached to the adjacent rear walls 8 of the cover 2 and base 3 of the box 1 in any well-known manner. The inner knuckles 20 and 33 of the two segments 14 and 13, respectively, of the hinge section 11 are placed between the two rear walls 8 of the box 1 with the interlocked knuckles 20 and 33 of the two segments 14 and 13, respectively, facing downwardly as shown in FIGS. 7 and 8 and the interlocked outer knuckles 21 and 34 of the two segments 14 and 13 face upwardly. The male outer knuckles 44 of the spring section 12 face downwardly and are interlocked by pins 46 with the upwardly facing outer knuckles 21 and 34 of the hinge section 11. With this structure, when the box 1 is closed the hinge assembly 10 assumes the position shown in FIG. 7. The spring section 12 presses outwardly on the hinge section 11 and will tend to prevent the segments 13–14 of the hinge section 11 from folding so as to keep the cover 2 in a closed position (FIG. 7). When the box 1 is open, the hinge assembly 10 assumes the position in FIG. 8. The spring section 12 is stretched out and is pressing inwardly on the hinge section 11. This will tend to prevent the segments 13 and 14 of the hinge section 11 from unfolding so as to keep the cover 2 open (FIG. 8). In either position, the pressure exerted by the spring section 12 on the hinge section 11 will maintain a constant contact between the two segments 13 and 14 of the hinge section 11 so that any electrical charge will automatically pass to ground through the two segments 13 and 14 of the hinge section 11. In other words, the spring section 12 of the assembled hinge assembly 10 exerts pressure on the hinge section 11 which will not only prevent the segments 13 and 14 of the hinge section 11 from inadvertently folding in one direction or the other and prevent inadvertent opening and closing of the box 1 but will also keep the two segments 13 and 14 of the hinge segment 11 into positive contact and engagement with each other and permit conduction between the two segments 13 and 14 so as to automatically ground the cover 2 of the box 1 to the base 3 and to the metal trough 9.

Figure 6A:
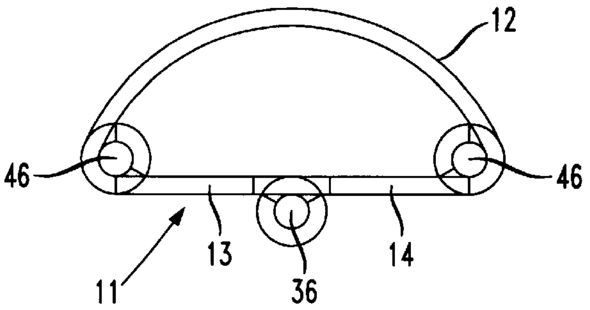
FIGS. 6A to 6D are end views showing the relative positions of the two sections of the hinge assembly under various conditions to illustrate the forces exerted by the spring section on the hinge section.
Figure 6B:
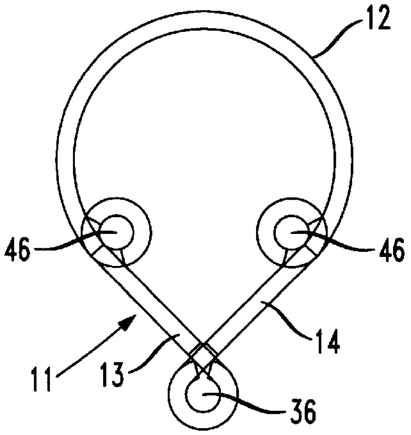
Figure 6C:
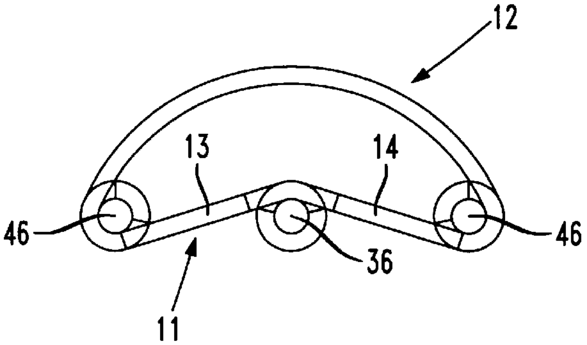
Figure 6D:
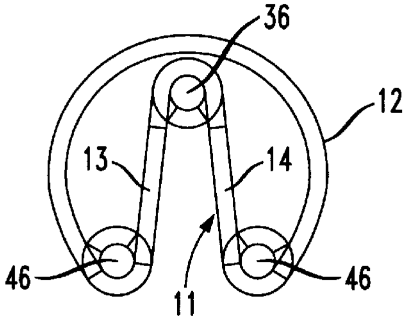

FIGS. 6A to 6D show relative positions of the two sections 11–12 of the hinge assembly 10 to illustrate the force the spring section 12 exerts on the hinge section 11 and the positions of the parts under various conditions. In FIG. 6A, the spring section 12 is pressing outwardly on the hinge section 11 thereby keeping the metal segments 13 and 14 of the hinge section 11 in contact with each other and prevent them from inadvertently folding. This is the position of the parts when the cover 2 of the box 1 is closed. The pressure exerted by the spring section 12 on the hinge section 11 will keep the box 1 closed. In FIG. 6B, the spring section 12 will press on the hinge section 11 and keep the hinge section 11 in the position shown. In FIG. 6C, the pins 46, 36 and 46 are in line with each other so that the spring section 12 exerts no pressure and has no effect on the hinge section 11. In FIG. 6D, the spring section 12 presses inwardly on the hinge section 11 to prevent the segments 13 and 14 from unfolding. This is generally the position when the cover 2 of the box 1 is open. The pressure exerted by the spring section 12 on the hinge section 11 will keep the box 1 open.

In the drawing and in the preferred embodiment of the invention the hinge assembly 10 is shown as being a one piece elongated structure mounted along its entire length to the rear walls 8 of the box 1. It will be understood that it is within the purview of the present invention for the hinge assembly 10 to be of short separate pieces which may be attached to the rear walls 8 of the box 1 at spaced intervals therealong.

It will thus be seen that the present invention provides an improved hinge assembly which will keep the box in its open or closed position and prevent if from opening or closing inadvertently and which also acts as a ground between the base and the cover of a box.

As many varied modifications of the subject matter of this invention will become apparent to those skilled in the art from the detailed description given hereinabove, it will be understood that the present invention is limited only as provided in the claims appended hereto.

Embodiments of the invention in which a particular property or privilege is claimed are as follows:

1. A hinge assembly comprising a hinge section and an arcuate resilient spring section having opposite side edges, said hinge section having a pair of segments pivotally mounted to each other; each of said segments having an outer channel-forming knuckle, each of said spring section side edges being formed as a channel-forming knuckle, each of said knuckles of the spring section being pivotally and cooperatively mounted to a corresponding outer knuckle of the hinge section; said spring section continuously urging the two segments of the hinge section into conductive contact with each other and to prevent inadvertent folding or unfolding of the segments of the hinge section.

2. A hinge assembly as set forth in claim 1 wherein said outer knuckles extend from an outer side edge of each segment.

3. A hinge assembly as set forth in claim 2 wherein the outer knuckles on the hinge section are spaced from each other and wherein the knuckles of the spring section are inserted between the outer knuckles of the hinge section and are pivotally connected thereto.

4. A hinge assembly as set forth in claim 3 wherein said spring section comprises a U-shaped loop with its knuckles extending from each side edge thereof and in which the knuckles are coiled inwardly toward each other.

5. A hinge assembly as set forth in claim 4 wherein the loop of the spring section comprises spaced legs and wherein the knuckles extending from the side edges thereof are spaced apart less than the diametrical distance between said legs.

6. A hinge assembly as set forth in claim 5 wherein the segments of the hinge section comprise a male segment and a female segment and wherein the female segment has spaced inner channel-forming knuckles extending from its inner side edge and the male segment has inner male channel-forming knuckles extending from its inner side edge which extend into the space between the inner knuckles of the female segment and are pivotally connected thereto.

7. A hinge assembly as set forth in claim 6 wherein the inner knuckles of the female and male segments are coiled in a direction opposite to the direction of the outer knuckles of the male and female segments.

8. A box comprising a cover and a base, a hinge assembly pivotally connecting the cover and base together, said hinge assembly comprising a hinge section and an arcuate resilient spring section having opposite side edges, said hinge section having a pair of segments pivotally mounted to each other; each of said segments having an outer channel-forming knuckle, each of said spring section side edges being formed as a channel-forming knuckle, each of said knuckles of the spring section being pivotally and cooperatively mounted to a corresponding outer knuckle of the hinge section; said spring section continuously urging the two segments of the hinge section into conductive contact with each other and to prevent inadvertent folding or unfolding of the segments of the hinge section.

9. A box as set forth in claim 8 wherein said outer knuckles extend from an outer side edge of each segment.

10. A box as set forth in claim 9 wherein the outer knuckles on the hinge section are spaced from each other and wherein the knuckles of the spring section are inserted between the outer knuckles of the hinge section and are pivotally connected thereto.

11. A box as set forth in claim 10 wherein said spring section comprises an arcuate spring in the form of a U-shaped loop with its knuckles extending from each side edge thereof and in which the knuckles are coiled inwardly toward each other.

12. A box as set forth in claim 11 wherein the loop of the spring section comprises spaced legs and wherein the knuckles extending from the side edges thereof are spaced apart less than the diametrical distance between said legs.

13. A box as set forth in claim 12 wherein the segments of the hinge section comprise a male segment and a female segment and wherein the female segment has spaced inner channel-forming knuckles extending from its inner side edge and the male segment has inner male channel-forming knuckles extending from its inner side edge which extend into the space between the inner knuckles of the female segment and are pivotally connected thereto.

14. A box as set forth in claim 13 wherein the inner knuckles of the female and male segments are coiled in a direction opposite to the direction of the outer knuckles of the male and female segments.

* * * * *